United States Patent
Kowalewski (10) Patent No.: US 11,288,163 B1
(45) Date of Patent: Mar. 29, 2022

(54) PORTABLE PERFORMANCE ANALYTICS SYSTEM AND METHOD

(71) Applicant: R-Stor Inc., Saratoga, CA (US)

(72) Inventor: Damian Kowalewski, Sunnyvale, CA (US)

(73) Assignee: R-Stor Inc., Saratoga, CA (US)

(*) Notice: Subject to any disclaimer, the term of this patent is extended or adjusted under 35 U.S.C. 154(b) by 212 days.

(21) Appl. No.: 16/444,929

(22) Filed: Jun. 18, 2019

Related U.S. Application Data (60) Provisional application No. 62/688,856, filed on Jun. 22, 2018.

(51) Int. Cl.
 *G06F 11/34* (2006.01)
 *G06F 11/30* (2006.01)

(52) U.S. Cl.
 CPC ........ *G06F 11/3428* (2013.01); *G06F 11/302* (2013.01)

(58) Field of Classification Search
 CPC .. G06F 11/302; G06F 11/3428; G06F 9/5072; G06F 9/44505

USPC .................................................. 702/182, 183
 See application file for complete search history.

(56) References Cited

U.S. PATENT DOCUMENTS

| | | | | |
|---|---|---|---|---|
| 8,607,200 B2* | 12/2013 | Kunze | ................. | G06F 9/44505 |
| | | | | 717/124 |
| 8,788,243 B2* | 7/2014 | Peterson | ............. | G06F 11/3466 |
| | | | | 702/186 |
| 9,595,054 B2* | 3/2017 | Jain | ....................... | G06F 9/5072 |
| 2011/0238797 A1* | 9/2011 | Wee | ..................... | G06F 9/44505 |
| | | | | 709/220 |

\* cited by examiner

*Primary Examiner* — John H Le
(74) *Attorney, Agent, or Firm* — Rankin, Hill & Clark LLP (57) ABSTRACT

Systems and apparatus for generating portable performance analytics for different applications across multiple diverse computing platforms and methods for making and using the same. In various embodiment, the system can compare results from multiple runs of a selected application under different virtualized environment conditions and correlate these results to a native baremetal performance of the application. The system thereby can identify scalability issues, noisy neighbor outliers or any other performance abnormalities in different run-time environments among other things.

20 Claims, 6 Drawing Sheets

PORTABLE PERFORMANCE ANALYTICS SYSTEM AND METHOD

CROSS-REFERENCE TO RELATED APPLICATIONS

This application claims the benefit of, and priority to, U.S. Provisional Application Ser. No. 62/688,856, filed Jun. 22, 2018, the disclosure of which is hereby incorporated herein by reference in its entirety and for all purposes.

FIELD

The present disclosure relates generally to digital data processing and more particularly, but not exclusively, to systems and methods for generating portable performance analytics for different applications across multiple diverse computing platforms.

BACKGROUND

The heterogeneity of different computing platforms makes it very difficult to evaluate performance of a software application across the different platforms. The evaluation of the application performance across the different platforms is crucial to optimize the resources utilization of a given organization and its associated information technology (IT). Furthermore, scientific ways for evaluating and characterizing application performance requires an ability to conduct reproducible experiments across the different platforms under various run-time configuration conditions for comparison purposes.

Various performance analyzer tools, such as Intel VTune Analyzer, Iometer, Intel Trace Analyzer, exist for measuring the application performance across a broad spectrum of resources, such a central processing unit (CPU), a graphics processing unit (GPU), and an input/output (I/O) system. However, these performance analyzer tools are very complex to install, configure and invoke on computing platforms with a multi-node configuration. Moreover, performing unify measurements on multiple heterogeneous computing platforms at the same time can be a nearly impossible task for an engineer, scientist, researcher.

In view of the foregoing, a need exists for an improved system and method for generating portable performance analytics for different applications across multiple diverse computing platforms in an effort to overcome the aforementioned obstacles, challenges and deficiencies of conventional performance analyzer tools.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available performance analyzer tools are very complex to install, configure and invoke on computing platforms with multi-node configurations, a system and method that can generate portable performance analytics for different applications across multiple diverse computing platforms can prove desirable and provide a basis for a wide range of computer applications, including cloud-based applications. This result can be achieved, according to one embodiment disclosed herein, by a performance analytics method 100 as illustrated in FIG. 1.

The availability of an extensive variety of diverse and otherwise different computing platforms can impede an evaluation of performance across the diverse computing platforms at the same time relative to a selected software application. Each computing platform can include one or more computers and/or one or more servers that are in communication with one or more network components via a computer network. The evaluation of application performance across the diverse computing platforms can be important for optimizing network resource utilization of a given organization. A portable performance analytics system is disclosed herein that advantageously can perform the application performance evaluation. The portable performance analytics system can be portable and/or operate across the diverse computing platforms to generate reproducible performance benchmarking and consistent price/performance analyses.

Figure 1:
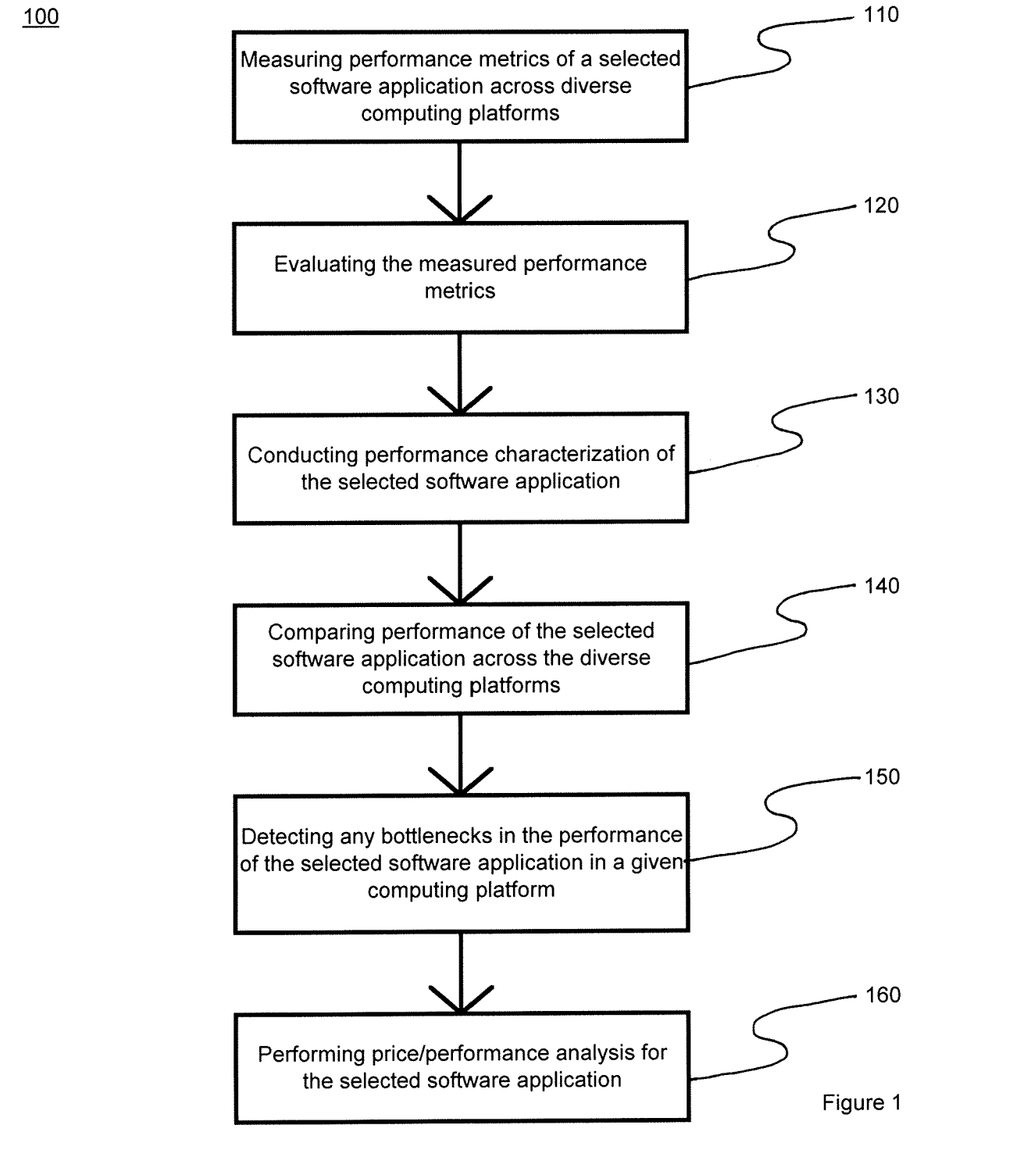
FIG. 1 is an exemplary top-level flow chart illustrating an embodiment of a method for generating performance analytics for a selected software application across multiple diverse computing platforms.
Figure 2:
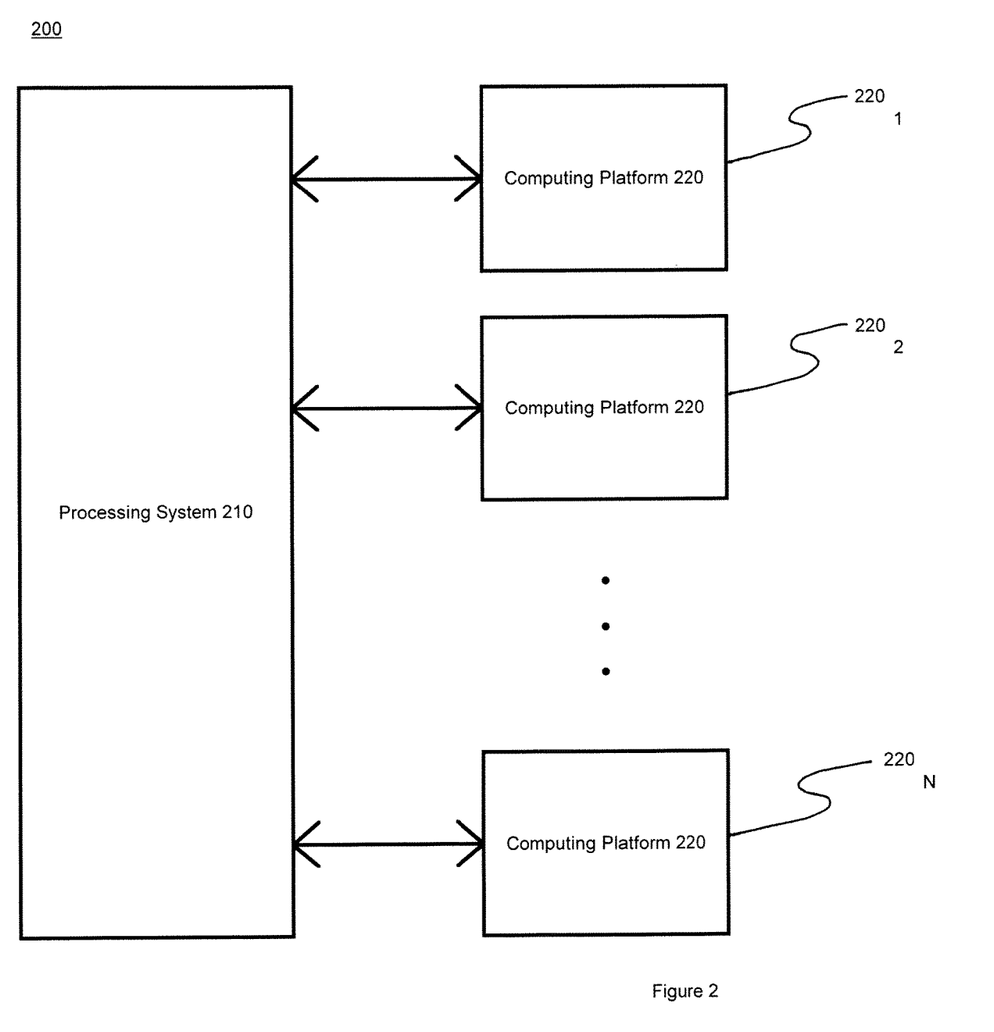
FIG. 2 is an exemplary top-level block diagram illustrating an embodiment of a system for executing the method of FIG. 1.

The exemplary performance analytics method 100 of FIG. 1 includes, at 110, measuring one or more performance metrics of a selected software application across a plurality of diverse (or different or heterogenetic) computing platforms and other computing systems 220 (shown in FIG. 2). At 120, the measured performance metrics are evaluated. Performance characterization of the selected software application is conducted, at 130. Performance of the selected software application across the diverse computing platforms 220 is compared, at 140. The method 100, at 150, can detect any bottlenecks (or other weak points) in the performance of the selected software application in a given computing platform (or system) 220, and, at 160, perform price/performance analysis for the selected software application. In some embodiments, the portable performance analytics method 100 can operate on a plurality of selected software applications, including operating on the plurality of selected software applications in parallel (or at the same time).

An exemplary performance analytics system 200 for executing the method 100 is shown in FIG. 2. The performance analytics system 200 is shown as including a central processing system 210. The selected software application can be available via the central processing system 210. The performance analytics system 200 can communicate with the plurality of diverse (or different or heterogenetic) computing platforms and other computing systems 220. For example, the performance analytics system 200 can provide the selected software application to the relevant diverse computing platforms 220 and receive (or otherwise measure) the performance metrics of the selected software application from the diverse computing platforms 220.

Advantageously, the portable performance analytics method 100 and system 200 can help to provide a better insight into the performance of the selected software application on the multiple diverse computing platforms, compare between them (e.g. plotting and charts), catalog application performance analysis results over time and/or reproduce the application performance analysis results. The portable performance analytics system likewise can provide access to the performance analytics gathered at every run of the selected software application, present basic performance ratios and metrics and/or chart application performance against historical runs as well runs on different computing platforms. For example, the portable performance analytics system can help to correlate application performance on the cloud and on different platforms.

Since performance characterization results in the cloud, in virtualized environments and/or other types of computer platforms can have a large variability, a virtually uniformed portable performance analytics (or analysis) system advantageously can compare results from multiple runs of a selected software application under different virtualized environment conditions and correlate these results to a native baremetal performance of the application. The system thereby can identify scalability issues, noisy neighbor outliers or any other performance abnormalities in different run-time environments. A performance advisor based on running the portable performance analytics system on multiple computing platforms with various software and hardware parameters can enable the results analysis to focus on one or more top software and/or hardware elements that are most impactful for improving performance of the selected application across a predetermined computer platform, which typically includes a central processing unit (or CPU), a memory, a network and an input/output (or I/O) system.

In one embodiment, the portable performance analytics system can flag or otherwise identify poor performance along one or more of following metrics:

Vectorization, ILP;
MPI imbalance;
Scaling issues; and/or
Rightsizing: MPI-OMP ranks vs threads, cloud instance selection.

In an exemplary embodiment, the portable performance analytics system can provide a simple application performance benchmarking utility. The application performance benchmarking utility enable easy and reproducible benchmarking across different architectural parameters, representing an apparatus for citations. As a result of invoking the portable performance analytics system with different software and hardware parameters, the portable performance analytics system can obtain performance advice on what hardware parameter(s) need to improve for better performance. For example, the portable performance analytics system can present software and/or hardware advice that targets top performance bottleneck of application performance.

Performance monitoring of different software applications across multiple different computer platforms can present several problems. Monitoring the performance of the different software applications, for example, can be a complicated and tedious process. A variety of tools, measurements and different configuration parameters to consider also can make the performance monitoring difficult and expensive. The present disclosure teaches a set of new tools for simplifying and otherwise solving these problems. The tools can include tools for creating portable applications, tools for setting up and launching these portable applications on several supercomputing clusters and multi-cloud providers and tools for obtaining performance data from these runs. The new tools thereby can provide consistent and repeatable results across multiple runs of the software applications on the different computer platforms.

The tools of the portable performance analytics system advantageously can simplify and solve the above-identified problems. In one embodiment, the tools of the portable performance analytics system can create portable applications, set up and launch these portable applications on several supercomputing clusters and multi-cloud providers and/or obtain performance data from these runs. Additionally and/or alternatively, the tools of the portable performance analytics system can evaluate the performance of a job in real-time. Thereby, after a few minutes of job execution, a user, for example, can decide to cancel the job on one computer platform and move the job to another computer platform to get better performance and/or lower cost in view of a recommendation generated by the tools.

A manner by which the tools of the portable performance analytics system can solve the problem is illustrated by the following example. In this example, the portable performance analytics system can characterize the performance of a selected computer application called OpenFoam, an open source fluid dynamic application, and analyze any bottlenecks created by running the OpenFoam application. For illustration purposes only, a containerized OpenFoam application workflow with a sample dataset can be used to benchmark performance of the OpenFoam application in different supercomputing environments.

Figure 3A:
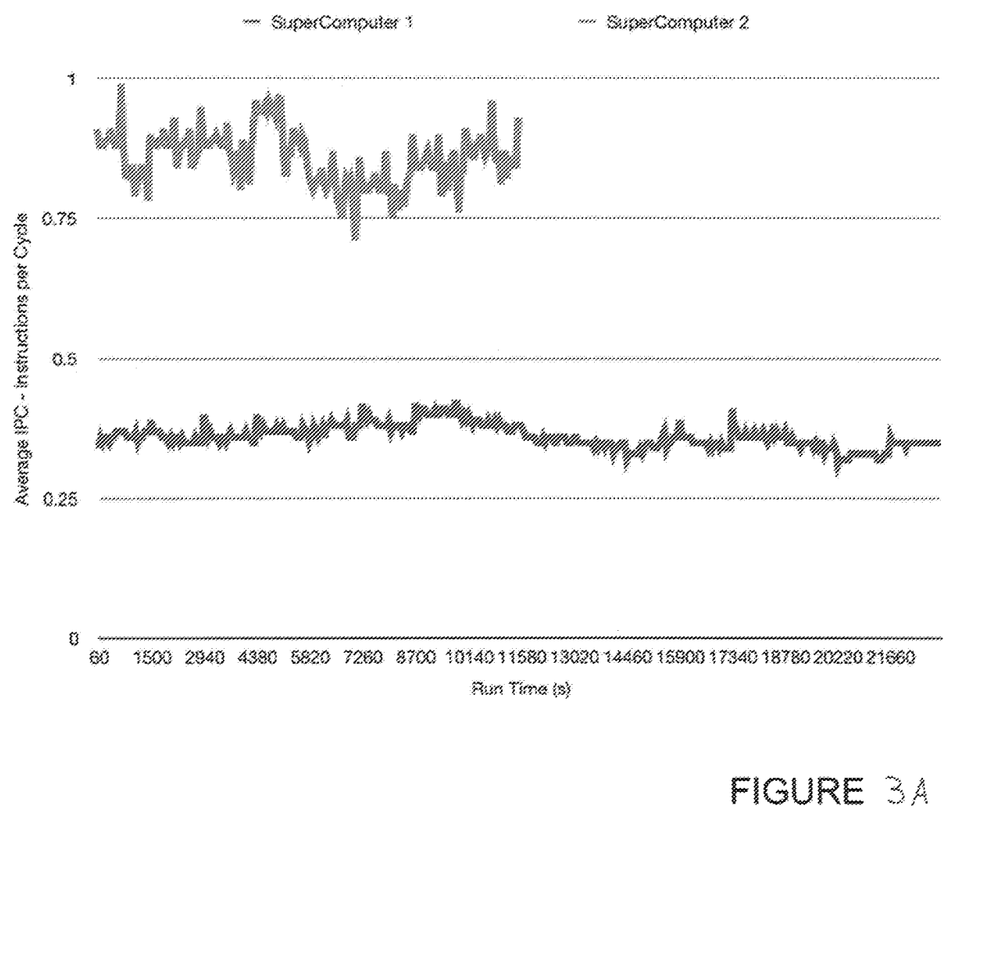
FIG. 3A is an exemplary graph comparing average instructions per cycle versus run-time for a selected software application running on two supercomputers.
Figure 3B:
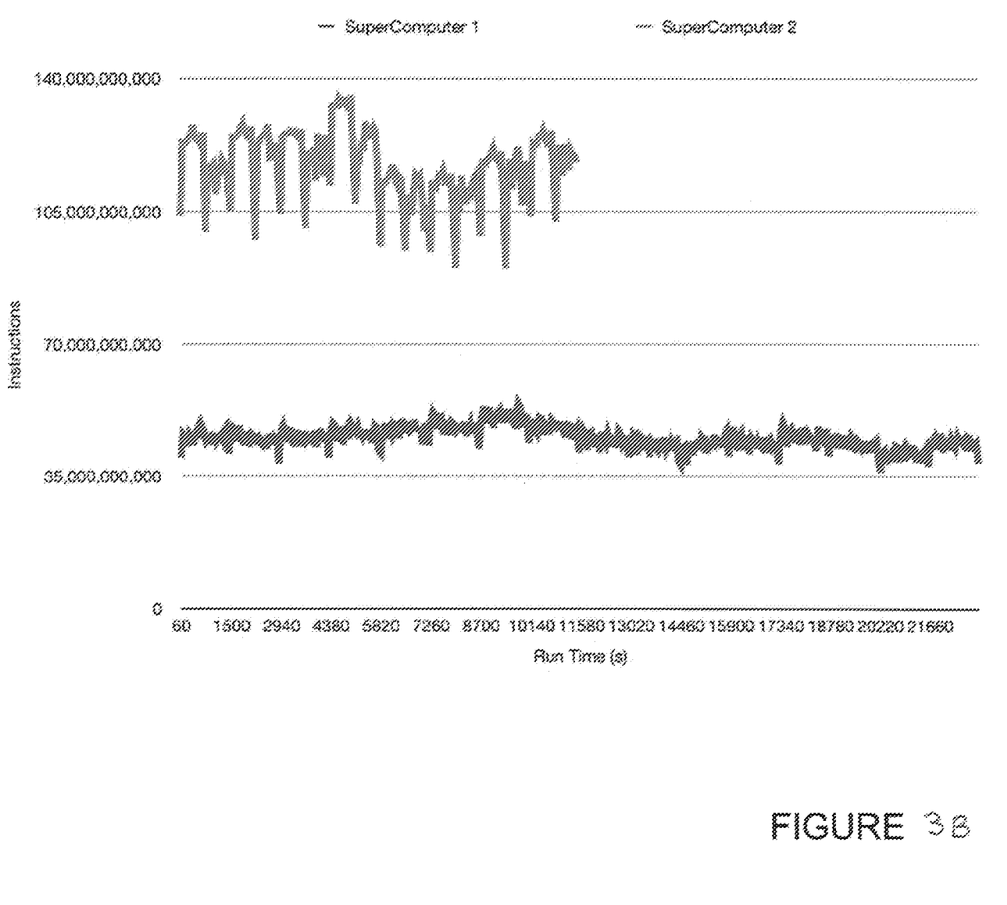
FIG. 3B is an exemplary graph comparing average memory operations versus run-time for the selected software application of FIG. 3A running on the supercomputers.

Turning to FIGS. 3A-B, illustrative results of Instructions per Second and memory operations of an execution of the OpenFoam application on two different supercomputers are shown. In other words, FIG. 3A shows an exemplary average instructions per cycle of all processes of an execution of the OpenFoam application on Supercomputer 1 and Supercomputer 2; whereas, FIG. 3B shows an exemplary average memory operations of all processes of the execution of the OpenFoam application on the Supercomputer 1 and the Supercomputer 2. The results shown in FIGS. 3A-B indicate that the Supercomputer 2 performs in both cases a bit more than twice faster than Supercomputer 1. In addition, the final run-time of the OpenFoam application scales in the same order than these two metrics, demonstrating that with simple metrics, the portable performance analytics system can provide good insights of the performance of an application in a given system.

Figure 4:
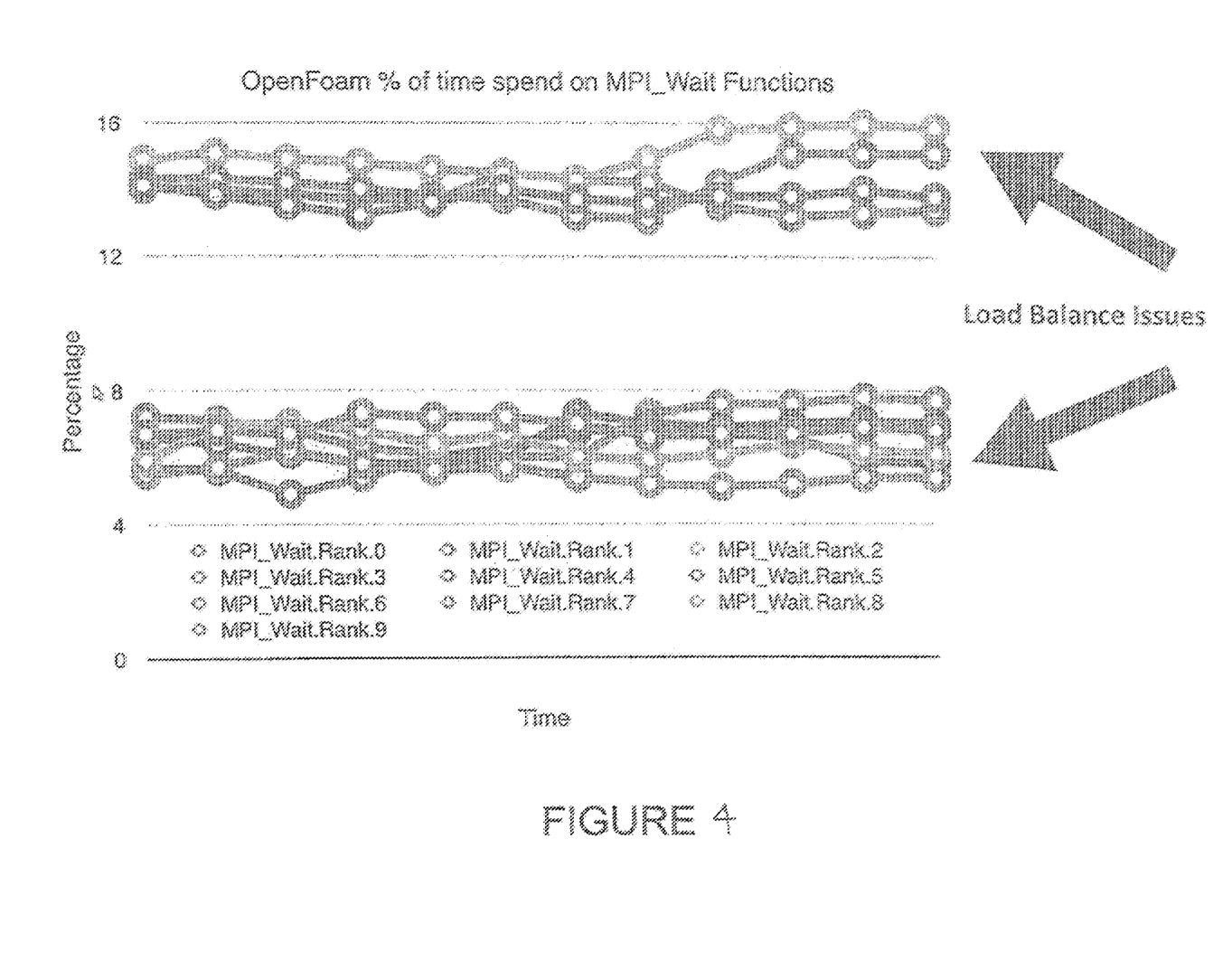
FIG. 4 is an exemplary graph comparing a percentage of time spent on a Multiple Protocol Interface (MPI) wait function by different processes for the selected application of FIGS. 3A-B running on a plurality of different computer platforms.

Expanding on the above example, the portable performance analytics system can analyze performance information from Multiple Protocol Interface (MPI) function calls. The tools of the portable performance analytics system, for instance, can be utilized to detect load balance issues as illustrated in FIG. 4. Turning to FIG. 4, a percentage of time spent on a MPI wait function by different processes for the OpenFoam application running on a plurality of different computer platforms is shown. The different percentage of time spent on the MPI wait function by the different processes indicates a load balance issue in a specific run the OpenFoam application. Here, the graph of FIG. 4 indicates that the issue is not the hardware itself as in the previous case, but a configuration of the hardware and software parameters on this run.

Through this characterization process, the portable performance analytics system advantageously can offer advice with selecting a right queue for better performance. Exemplary advice can include identifying a lower latency network interconnect, a more powerful CPU or more memory, without limitation. Some of performance inhibitors unveiled by the portable performance analytics system may not just be rooted in lack of more capable hardware platforms. In other words, metrics presented by the portable performance analytics system can detecting performance issues related with the software application itself and software application optimization, such as poor domain decomposition, low instruction level parallelism or low vectorization (as in example of MPI imbalance issue described above)

Figure 5:
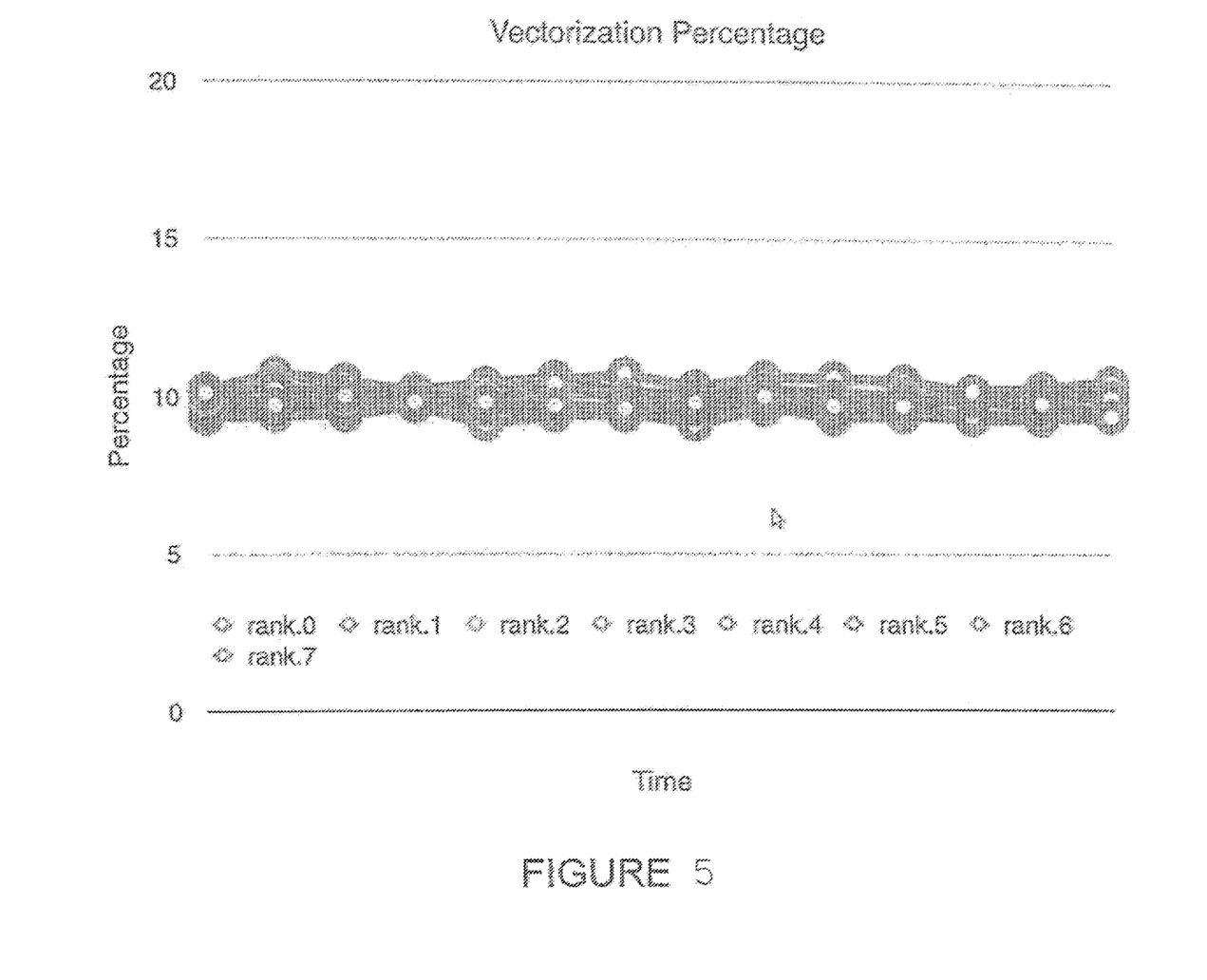
FIG. 5 is an exemplary graph comparing a percentage of vectorized instructions for the selected application of FIGS. 3A-B running on a plurality of different computer platforms.

FIG. 5 is an exemplary graph comparing a percentage of vectorized instructions for the OpenFoam application in accordance with the example discussed above with reference to FIGS. 3A-B and 4. Turning to FIG. 5, by analyzing the percentage of vectorized instructions on the run of the OpenFoam application, the portable performance analytics system can identify a software-related issue, which can indicate an opportunity for more optimized compiler flags, better code vectorization, usage of better performing parallel or vector libraries. The portable performance analytics system further can solve the software-related issue by rebuilding the OpenFoam application.

Advantageously, the tools of the portable performance analytics system can be utilized for displaying, evaluating and analyzing the performance data gathered across the multiple diverse computing platforms and/or extracting information for scalability tracking, performing a cloud vs bare metal comparison and resource optimization.

Although various implementations are discussed herein and shown in the figures, it will be understood that the principles described herein are not limited to such. For example, while particular scenarios are referenced, it will be understood that the principles described herein apply to any suitable type of computer network or other type of computing platform, including, but not limited to, a Local Area Network (LAN), a Wide Area Network (WAN), a Wireless Local Area Network (WLAN), a Metropolitan Area Network (MAN) and/or a Campus Area Network (CAN).

Accordingly, persons of ordinary skill in the art will understand that, although particular embodiments have been illustrated and described, the principles described herein can be applied to different types of computing platforms. Certain embodiments have been described for the purpose of simplifying the description, and it will be understood to persons skilled in the art that this is illustrative only. It will also be understood that reference to a "server," "computer," "network component" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

What is claimed is:

1. A computer-implemented method for generating performance analytics for a selected software application across a plurality of diverse computing platforms, comprising:

executing the selected software application at each computing platform in the plurality of diverse computing platforms;

receiving one or more performance metrics from each computing platform in the plurality of diverse computing platforms about the execution of the selected software application at each computing platform in the plurality of diverse computing platforms;

comparing a performance of the selected software application at each one computing platform in the plurality of diverse computing platforms based on the one or more performance metrics;

detecting a weak point in the performance of the selected software application in a selected computing platform, wherein the selected computing platform is selected from the plurality of diverse computing platforms; and performing a performance analysis for the selected software application.

2. The computer-implemented method of claim 1, wherein said receiving the one or more performance metrics comprises measuring the one or more performance metrics of the selected software application at each computing platform in the plurality of diverse computing platforms, and further comprising evaluating the measured performance metrics.

3. The computer-implemented method of claim 2, further comprising conducting performance characterization of the selected software application based upon said measuring the one or more performance metrics and said evaluating the measured performance metrics.

4. The computer-implemented method of claim 1, wherein said detecting the weak point includes detecting a scalability issue for the selected software application, detecting a noisy neighbor outlier issue for the selected software application, detecting a bottleneck in the performance of the selected software application in the selected computing platform or a combination thereof.

5. The computer-implemented method of claim 1, wherein said performing the performance analysis includes performing a price analysis for the selected software application.

6. The computer-implemented method of claim 1, further comprising generating performance analytics for a second selected software application.

7. The computer-implemented method of claim 6, wherein said generating the performance analytics for the second selected software application includes:

executing the second selected software application at each computing platform in the plurality of diverse computing platforms;

receiving one or more performance metrics from each computing platform in the plurality of diverse computing platforms about the execution of the second selected software application at each computing platform in the plurality of diverse computing platforms;

comparing a performance of the second selected software application at each one computing platform in the plurality of diverse computing platforms based on the one or more performance metrics from each computing platform in the plurality of diverse computing platforms about the execution of the second selected software application;

detecting a weak point in the performance of the second selected software application in a second selected computing platform, wherein the second selected computing platform is selected from the plurality of diverse computing platforms; and performing a performance analysis for the second selected software application.

8. The computer-implemented method of claim 6, wherein said generating the performance analytics for the second selected software application includes:
   receiving one or more performance metrics from each computing platform in a second plurality of diverse computing platforms about the execution of the second selected software application at each computing platform in the second plurality of diverse computing platforms;
   comparing a performance of the second selected software application at each computing platform in the second plurality of diverse computing platforms;
   detecting a weak point in the performance of the second selected software application in a second selected computing platform among the second plurality of diverse computing platforms; and
   performing a performance analysis for the second selected software application.

9. The computer-implemented method of claim 8, wherein the plurality of diverse computing platforms and the second plurality of diverse computing platforms share at least one common computing platform.

10. The computer-implemented method of claim 6, wherein said generating the performance analytics for the second selected software application is performed in parallel with generating the performance analytics for the selected software application.

11. The computer-implemented method of claim 6, wherein said generating the performance analytics for the second selected software application is performed after generating the performance analytics for the selected software application.

12. The computer-implemented method of claim 1, further comprising repeating said receiving the one or more performance metrics, said comparing the performance of the selected software application, said detecting the weak point and said performing the performance analysis for multiple runs of the selected software application.

13. The computer-implemented method of claim 1, wherein said comparing the performance of the selected software application includes comparing the performance of the selected software application with historical performance of the selected software application.

14. The computer-implemented method of claim 13, wherein said comparing the performance of the selected software application includes comparing the performance of the selected software application with historical performance of the selected software application of a predetermined computing platforms that is not among the plurality of diverse computing platforms.

15. The computer-implemented method of claim 1, wherein said performing the performance analysis comprises performing the performance analysis for the selected software application in real time.

16. A non-transitory machine-readable storage media embodying a computer program product, said computer program product comprising:
   instruction for executing a selected software application at each one of a plurality of diverse computing platforms
   instruction for measuring one or more performance metrics of the selected software application at each one of the plurality of diverse computing platforms;
   instruction for comparing a performance of the selected software application at each one of the plurality of diverse computing platforms based on the one or more performance metrics;
   instruction for detecting a weak point in the performance of the selected software application in a selected computing platform, wherein the selected computing platform is one of the plurality of diverse computing platforms; and
   instruction for performing a performance analysis for the selected software application.

17. The non-transitory machine-readable storage media of claim 16, wherein said instruction for measuring, said instruction for comparing, said instruction for detecting and said instruction for performing each are encoded on the non-transitory machine-readable storage media.

18. A system for generating performance analytics for a selected software application, comprising:
   a plurality of diverse computing platforms; and
   a processing circuit for executing the selected software application at each one of the plurality of diverse computing platforms, measuring one or more performance metrics of the selected software application about the execution of the selected software application at each one of the plurality of diverse computing platforms, comparing a performance of the selected software application across each one of the plurality of diverse computing platforms based on the one or more performance metrics, and detecting a weak point in the performance of the selected software application in a selected diverse computing platform, wherein said processing circuit performs a performance analysis for the selected software application.

19. The system of claim 18, wherein said diverse computing platforms include at least one supercomputing environment.

20. The system of claim 18, wherein said diverse computing platforms include at least one cloud-based computing environment.

* * * * *